US012756027B2

(12) United States Patent
Uchida

(10) Patent No.: US 12,756,027 B2
(45) Date of Patent: Oct. 6, 2026

(54) LITHIUM ION BATTERY PROCESSING METHOD

(71) Applicant: Prime Planet Energy & Solutions, Inc., Tokyo (JP)

(72) Inventor: Yozo Uchida, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 598 days.

(21) Appl. No.: 18/350,100

(22) Filed: Jul. 11, 2023

(65) Prior Publication Data

US 2024/0021901 A1 Jan. 18, 2024

(30) Foreign Application Priority Data

Jul. 15, 2022 (JP) ................................ 2022-113651

(51) Int. Cl.
*H01M 10/54* (2006.01)
*B24C 1/04* (2006.01)
*B26F 3/00* (2006.01)

(52) U.S. Cl.
CPC ............. *H01M 10/54* (2013.01); *B24C 1/045* (2013.01); *B26F 3/004* (2013.01)

(58) Field of Classification Search
CPC .. H01M 10/54; H01M 50/543; H01M 50/102; H01M 50/147; H01M 50/531; H01M 10/0525; B24C 1/045; B26F 3/004; Y02W 30/84; B09B 3/30; B09B 5/00; B09B 2101/16; B26D 9/00
See application file for complete search history.

(56) References Cited

U.S. PATENT DOCUMENTS

| | | | | |
|---|---|---|---|---|
| 5,491,037 | A * | 2/1996 | Kawakami .............. | H01M 6/52 429/49 |
| 5,882,811 | A | 3/1999 | Kawakami | |
| 2001/0008723 | A1* | 7/2001 | Kawakami ............ | H01M 10/54 429/49 |
| 2008/0050295 | A1* | 2/2008 | Uchida ............... | H01M 10/052 423/179.5 |
| 2014/0093761 | A1* | 4/2014 | Sakanaka .......... | H01M 50/3425 429/82 |
| 2015/0209934 | A1 | 7/2015 | Makino et al. | |

(Continued)

FOREIGN PATENT DOCUMENTS

| | | |
|---|---|---|
| CN | 103825064 B | 5/2016 |
| EP | 0 613 198 B1 | 9/1999 |
| EP | 1 408 575 A2 | 4/2004 |

(Continued)

*Primary Examiner* — Michael Y Sun
(74) *Attorney, Agent, or Firm* — Finnegan, Henderson, Farabow, Garrett, and Dunner, LLP

(57) ABSTRACT

An embodiment of the present application provides a processing method including a collecting step and a cutting step. The collecting step involves collecting a lithium ion battery including: an electrode body; a battery case housing the electrode body; and an electrode terminal connected to the electrode body and partially exposed to outside of the battery case. The cutting step involves cutting a connection between the electrode terminal and the electrode body of the collected lithium ion battery by using a water jet cutter. The processing method includes no lithium ion battery discharging step between the collecting step and the cutting step.

6 Claims, 7 Drawing Sheets

(56) References Cited

U.S. PATENT DOCUMENTS

| | | | | |
|---|---|---|---|---|
| 2018/0013181 | A1 | 1/2018 | Ho et al. | |
| 2023/0175099 | A1* | 6/2023 | Bobbili | C22B 26/12<br>75/10.67 |

FOREIGN PATENT DOCUMENTS

| | | | |
|---|---|---|---|
| JP | 6-60429 | B2 | 8/1994 |
| JP | 6-251805 | A | 9/1994 |
| JP | 6-339900 | A | 12/1994 |
| JP | 2020-198320 | A | 12/2020 |
| JP | 6828214 | B1 | 2/2021 |
| KR | 10-2020-0052761 | A | 5/2020 |
| WO | WO 2014/054168 | A1 | 4/2014 |

* cited by examiner (S7) ELECTRODE BODY UNWINDING STEP (S8) COMPOSITE SEPARATING STEP

LITHIUM ION BATTERY PROCESSING METHOD

CROSS REFERENCE TO RELATED APPLICATION

This application claims the benefit of priority to Japanese Patent Application No. 2022-113651 filed on Jul. 15, 2022. The entire contents of this application are hereby incorporated herein by reference.

BACKGROUND OF THE DISCLOSURE

1. Field

The present application relates to lithium ion battery processing methods.

2. Background

To effectively utilize resources by reducing waste, conventional technologies involve collecting used lithium ion batteries so as to recycle battery materials. Prior art documents related to such technologies include, for example, JP 2020-198320 A, Japanese Patent No. 6828214, and JP 6-251805 A. These documents disclose forcedly discharging a lithium ion battery before disassembling the lithium ion battery so as to prevent ignition caused by a short circuit between positive and negative electrodes during disassembling. JP 2020-198320 A discloses a technique involving: cutting an exterior body of a lithium ion battery with, for example, a tool (such as an end mill) or laser after a discharging process; removing an electrode body from the exterior body; and collecting valuable metals, such as nickel (Ni) and cobalt (Co), which are recyclable resources.

SUMMARY

Findings obtained by the inventor of the present application, however, suggest that lithium ion batteries collected usually vary in state of charge (SOC). Variations in SOC unfortunately complicate the operation of a discharging process, leading to an increase in cost. If lithium ion batteries are temporarily discharged to 0 V, letting the lithium ion batteries stand for a while may increase the voltages thereof, making it difficult to completely discharge the lithium ion batteries to 0 V. Lithium ion batteries collected may include ones that are unusable because of, for example, overcharge or overdischarge. In this case, a safety device is usually activated, which may make it impossible to perform a discharging process. Cutting a lithium ion battery having a voltage with a tool or laser as described in JP 2020-198320 A and Japanese Patent No. 6828214 may cause a short circuit between positive and negative electrodes, which may result in ignition. This requires strict safety measures (such as preparing a fire extinguishing system in advance) in performing the cutting operation.

Accordingly, embodiments of the present application provide lithium ion battery processing methods that are simpler and safter than ever before.

An embodiment of the present application provides a lithium ion battery processing method including a collecting step and a cutting step. The collecting step involves collecting a lithium ion battery including: an electrode body; a battery case including an opening and housing the electrode body; a lid closing the opening of the battery case; and an electrode terminal connected to the electrode body inside the battery case and partially exposed to outside of the battery case. The cutting step involves cutting a connection between the electrode terminal and the electrode body of the collected lithium ion battery by using a water jet cutter. The processing method includes no lithium ion battery discharging step between the collecting step and the cutting step.

The water jet cutter pressurizes a fluid, such as water, and ejects the fluid at high pressure to a cutting target so as to cut the cutting target. The cutting step involves using the water jet cutter. This makes it possible to not only cut the cutting target (which is the lithium ion battery in this embodiment) without being affected by heat, but also achieve cooling effect, which reduces or prevents the risk of ignition. The use of the water jet cutter also leads to improved safety. Accordingly, this embodiment eliminates the need to discharge the lithium ion battery in advance, making it possible to process the lithium ion battery more easily than before. The water jet cutter usually includes a table which is disposed in a water tank and on which the cutting target is to be placed. Consequently, in the event that the lithium ion battery is ignited during the cutting step, the lithium ion battery is immersed in water in the water tank, which extinguishes a fire in the lithium ion battery. This eliminates the need to additionally prepare a fire extinguishing system, resulting in a reduction in the burden of advance preparations.

The above and other elements, features, steps, characteristics, and advantages of the present application will become more apparent from the following detailed description of the preferred embodiments with reference to the attached drawings.

BRIEF DESCRIPTION OF THE DRAWINGS

FIG. 2 is a cross-sectional view of the lithium ion battery taken along the line II-II in

FIG. 1.

DETAILED DESCRIPTION OF THE PREFERRED EMBODIMENTS

Preferred embodiments of processing methods disclosed herein will be described below with reference to the drawings. Matters that are necessary for carrying out the present application but are not specifically mentioned herein may be understood by those skilled in the art as design matters based on techniques known in the related art. The present application may be carried out on the basis of the description given herein and common technical knowledge in the related art.

As used herein, the term "battery" refers to any of various electricity storage devices from which electric energy is derivable, and is a concept encompassing primary batteries and secondary batteries. As used herein, the term "secondary battery" refers to any of various electricity storage devices that are repeatedly chargeable and dischargeable, and is a concept encompassing not only storage batteries (or chemical batteries), such as lithium ion secondary batteries, but also lithium ion capacitors (or physical batteries).

Structure of Battery 100

Figure 1:
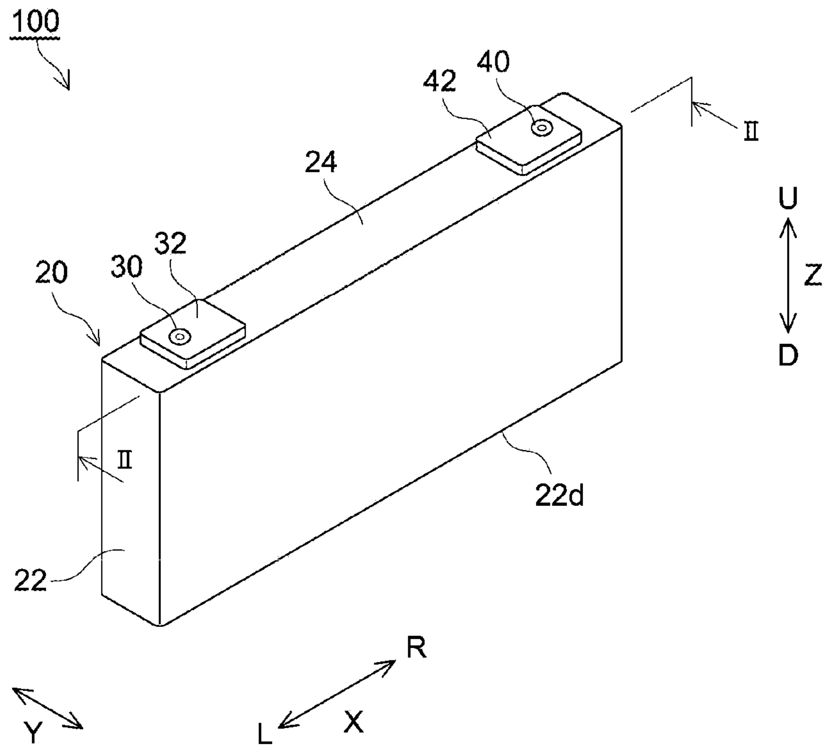
FIG. 1 is a schematic perspective view of a lithium ion battery according to an embodiment of the present application.
Figure 2:
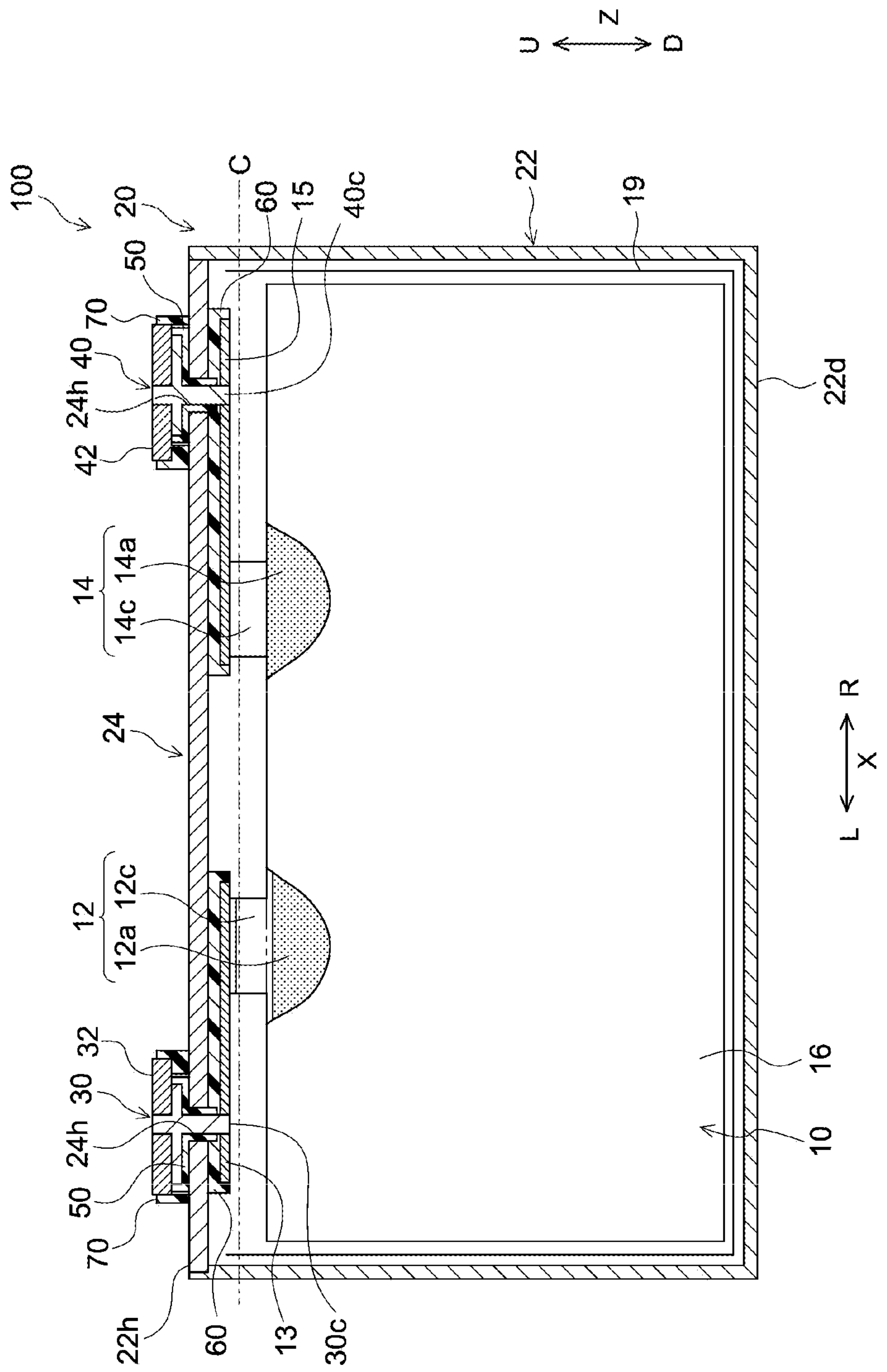

FIG. 1 is a perspective view of a lithium ion battery 100 (which may hereinafter be simply referred to as a "battery 100") to be subjected to a processing method disclosed herein. FIG. 2 is a cross-sectional view of the battery 100 taken along the line II-II in FIG. 1. In the following description, the reference signs L, R, F, Rr, U, and D in the drawings respectively represent left, right, front, rear, up, and down. A direction along the long sides of the battery 100 in a plan view will hereinafter be referred to as a "long-side direction X". A direction along the short sides of the battery 100 in the plan view will hereinafter be referred to as a "short-side direction Y". A direction along the height of the battery 100 will hereinafter be referred to as an "up-down direction Z". These directions, however, are defined merely for the sake of convenience of description and do not limit in any way how the battery 100 may be installed. Components and elements having the same functions are identified by the same reference signs in the drawings below, and description thereof may be simplified or omitted when deemed redundant.

As illustrated in FIG. 2, the battery 100 includes an electrode body 10, an exterior body a positive electrode terminal 30, and a negative electrode terminal 40. Although not illustrated, the battery 100 in the present embodiment further includes an electrolytic solution. In the present embodiment, the battery 100 is a nonaqueous electrolytic solution secondary battery. The battery 100 may be similar in structure to any battery known in the art or any other battery.

As illustrated in FIG. 2, the electrode body 10 covered with an electrode body holder 19 made of an insulating resin sheet is disposed inside the exterior body 20. The electrode body includes a positive electrode 12 and a negative electrode 14. In the present embodiment, the electrode body 10 is a flat wound electrode body provided by: placing strip-shaped positive and negative electrodes 12 and 14 on top of another such that the positive and negative electrodes 12 and 14 are insulated from each other with strip-shaped separators 16 interposed therebetween; and winding the positive and negative electrodes 12 and 14 and the separators 16 around the winding axis of the electrode body 10. The electrode body 10 is housed in the exterior body 20 such that its winding axis is parallel or substantially parallel to the long-side direction X. Alternatively, the electrode body 10 may be housed in the exterior body 20 such that the winding axis is parallel or substantially parallel to the up-down direction Z. The electrode body 10 may be a laminated electrode body including quadrangular positive and negative electrodes stacked on top of another such that the positive and negative electrodes are insulated from each other.

The positive electrode 12 includes a positive electrode collector 12*c* and a positive electrode composite layer 12*a* fixed onto the positive electrode collector 12*c*. The positive electrode collector 12*c* is made of, for example, a conductive metal, such as aluminum, an aluminum alloy, nickel, or stainless steel. In the present embodiment, the positive electrode collector 12*c* is made of aluminum. The positive electrode composite layer 12*a* typically includes: a positive electrode active material that is able to reversibly store and discharge charge carriers (e.g., a lithium transition metal composite oxide); and a binder (e.g., polyvinylidene fluoride (PVDF)).

The negative electrode 14 includes a negative electrode collector 14*c* and a negative electrode composite layer 14*a* fixed onto the negative electrode collector 14*c*. The negative electrode collector 14*c* is made of, for example, a conductive metal, such as copper, a copper alloy, nickel, or stainless steel. In the present embodiment, the negative electrode collector 14*c* is made of copper. The negative electrode composite layer 14*a* typically includes: a negative electrode active material that is able to reversibly store and discharge charge carriers (e.g., a carbon material, such as graphite); and a binder (e.g., styrene-butadiene rubber (SBR) or carboxymethylcellulose (CMC)).

A portion (or a positive electrode tab) of the positive electrode collector 12*c* provided with no positive electrode composite layer 12*a* is exposed at an upper end of the positive electrode 12. A positive electrode lead member 13 is attached to the positive electrode tab. The positive electrode lead member 13 extends along an inner surface of the exterior body 20. The positive electrode lead member 13 may be made of the same metal material as the positive electrode collector 12*c*. The positive electrode lead member 13 may be made of, for example, a conductive metal, such as aluminum, an aluminum alloy, nickel, or stainless steel. A portion (or a negative electrode tab) of the negative electrode collector 14*c* provided with no negative electrode composite layer 14*a* is exposed at an upper end of the negative electrode 14. A negative electrode lead member 15 is attached to the negative electrode tab. The negative electrode lead member 15 extends along the inner surface of the exterior body 20. The negative electrode lead member 15 may be made of the same metal material as the negative electrode collector 14*c*. The negative electrode lead member 15 may be made of, for example, a conductive metal, such as copper, a copper alloy, nickel, or stainless steel.

The electrolytic solution is, for example, a nonaqueous liquid electrolyte (or a nonaqueous electrolytic solution) containing a nonaqueous solvent and a lithium salt (or a supporting electrolyte). Examples of the nonaqueous solvent include carbonates, such as ethylene carbonate (EC), dimethyl carbonate (DMC), and ethyl methyl carbonate (EMC). Examples of the supporting electrolyte include a fluorine-containing lithium salt, such as lithium hexafluorophosphate ($LiPF_6$).

As illustrated in FIG. 1, the exterior body 20 in the present embodiment has a flat cuboidal shape (or rectangular shape). Alternatively, the exterior body 20 may have any other suitable shape, such as a cylindrical shape. The exterior body 20 may be made of any material known in the art or any other suitable material. The exterior body 20 is made of, for example, a lightweight, highly thermally conductive metal material, such as aluminum, an aluminum alloy, or stainless steel. In the present embodiment, the exterior body 20 is made of aluminum. As illustrated in FIG. 2, the exterior body 20 includes: a battery case 22 provided at its upper surface with an opening 22*h*; and a lid (or closing plate) 24 closing the opening 22*h*. The lid 24 is connected (e.g., welded) to a portion of the battery case 22 defining a peripheral edge of the opening 22*h*, so that the battery case 22 and the lid 24 of the exterior body 20 are integral with each other. The exterior body 20 is sealed airtightly (or closed hermetically).

The battery case 22 is a casing housing the electrode body 10 and storing the electrolytic solution. The battery case 22 includes the opening 22*h* and a bottom wall 22*d* facing the opening 22*h*. The opening 22*h* and the bottom wall 22*d* of the battery case 22 each have a substantially rectangular shape. As used herein, the term "substantially rectangular shape" refers to not only a perfect rectangular shape (or a perfect oblong shape) but also various other rectangular shapes, such as a rectangular shape whose corners connecting long and short sides are rounded and a rectangular shape whose corners have cut-outs.

The lid 24 is a plate member closing the opening 22*h* of the battery case 22. The lid 24 has a substantially rectangular shape. The lid 24 is fitted to the opening 22*h* of the battery case 22 such that the lid 24 faces the bottom wall 22*d*. Ends of the lid 24 in the long-side direction X are each provided with a through hole 24*h*. The through hole 24*h* located on a first side in the long-side direction X (i.e., the left side in FIG. 2) is provided for the positive electrode 12. The through hole 24*h* located on a second side in the long-side direction X (i.e., the right side in FIG. 2) is provided for the negative electrode 14.

The positive electrode terminal 30 and the negative electrode terminal 40 are each inserted through the associated through hole 24*h* and extend from inside to outside of the exterior body 20. The positive electrode terminal 30 may hereinafter be referred to as an "electrode terminal 30". The negative electrode terminal 40 may hereinafter be referred to as an "electrode terminal 40". The electrode terminals 30 and 40 are each disposed on an associated one of the ends of the lid 24 in the long-side direction X. In the present embodiment, the electrode terminals 30 and 40 are attached to the same surface (or specifically, the lid 24) of the exterior body 20. The electrode terminals 30 and 40 are swaged to portions of the lid 24 surrounding peripheral edges of the through holes 24*h*. Lower ends of the electrode terminals 30 and 40 are respectively provided with rivet portions 30*c* and 40*c*.

The positive electrode terminal 30 is electrically connected to the positive electrode 12 of the electrode body 10 through the positive electrode lead member 13 inside the battery case 22. The positive electrode terminal 30 is made of, for example, metal, such as aluminum, an aluminum alloy, nickel, or stainless steel. The positive electrode terminal 30 may be made of the same metal material as the positive electrode collector 12*c*. In the present embodiment, the positive electrode terminal 30 is made of aluminum. The negative electrode terminal 40 is electrically connected to the negative electrode 14 of the electrode body 10 through the negative electrode lead member 15 inside the battery case 22. The negative electrode terminal 40 is made of, for example, metal, such as copper, a copper alloy, nickel, or stainless steel. The negative electrode terminal 40 may be made of the same metal material as the negative electrode collector 14*c*. In the present embodiment, the negative electrode terminal 40 is made of copper.

The electrode terminal 30 is insulated from the lid 24 with a gasket 50 and an insulator 60 interposed therebetween. The electrode terminal 40 is insulated from the lid 24 with another gasket 50 and another insulator 60 interposed therebetween. The gaskets 50 are insulating members disposed between an upper surface (or outer surface) of the lid 24 and the electrode terminals 30 and 40. In the present embodiment, the gaskets 50 have the functions of insulating the lid 24 from the electrode terminals 30 and 40 and closing the through holes 24*h*. The insulators 60 are insulating members disposed between a lower surface (or inner surface) of the lid 24 and the lead members 13 and 15. The gaskets 50 and the insulators 60 are each made of an electrically insulating, elastically deformable resin material that is resistant to the electrolyte to be used. Examples of the resin material include: fluorinated resin, such as perfluoro alkoxy alkane (PFA); and polyphenylene sulfide (PPS).

The positive electrode terminal 30 is electrically connected to a plate-shaped positive electrode external conductive member 32 above the upper surface of the lid 24. The negative electrode terminal 40 is electrically connected to a plate-shaped negative electrode external conductive member 42 above the upper surface of the lid 24. The positive electrode external conductive member 32 and the negative electrode external conductive member 42 are each connected to another secondary battery and/or an external device through, for example, a busbar. The positive electrode external conductive member 32 and the negative electrode external conductive member 42 are insulated from the lid 24 with external insulating members 70. The positive electrode external conductive member 32 and the negative electrode external conductive member 42, however, may be optional.

The positive electrode external conductive member 32 and the negative electrode external conductive member 42 are each preferably made of a highly conductive metal. The positive electrode external conductive member 32 and the negative electrode external conductive member 42 are each made of, for example, aluminum, an aluminum alloy, copper, or a copper alloy. The positive electrode external conductive member 32 may be made of the same metal material as the positive electrode terminal 30. In the present embodiment, the positive electrode external conductive member 32 is made of aluminum. The negative electrode external conductive member 42 may be made of the same metal material as the negative electrode terminal 40. In the present embodiment, the negative electrode external conductive member 42 is made of copper.

Method for Processing Battery 100

Figure 3:
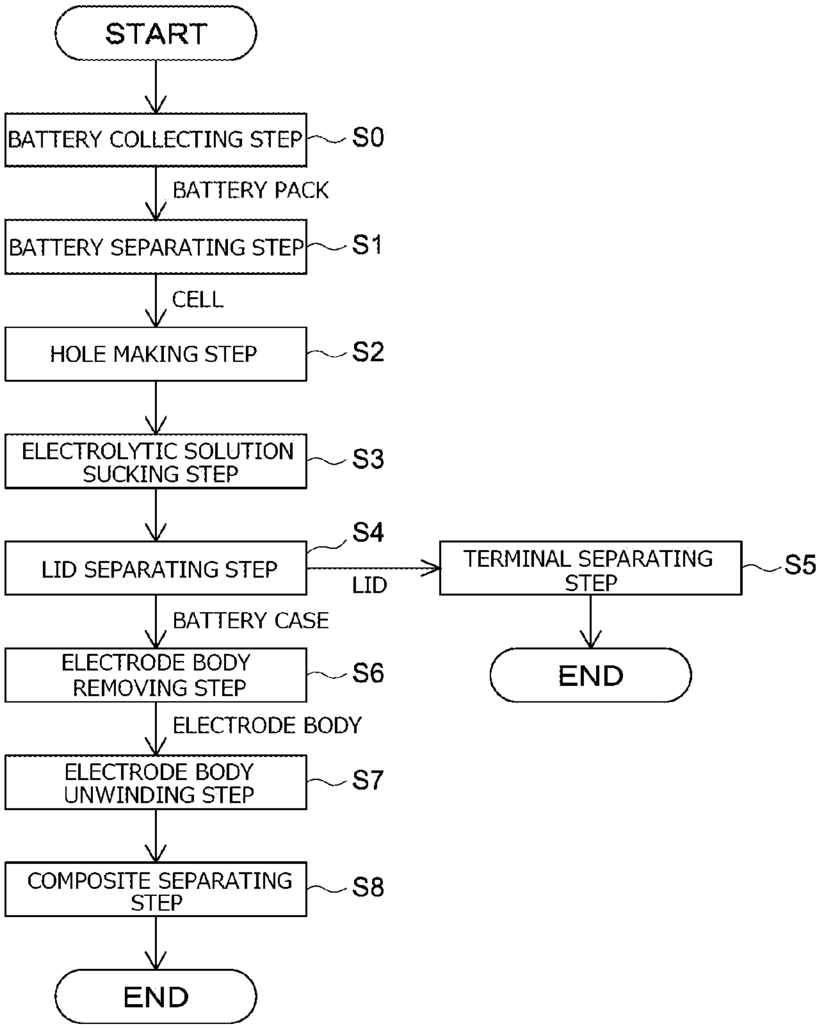
FIG. 3 is a flow chart of a processing method according to the embodiment of the present application.

FIG. 3 is a flow chart of a method for processing the batteries 100. The processing method according to the present embodiment is intended for a battery pack 200 (see FIG. 4) including the batteries 100 electrically connected to each other through busbars 250 (see FIG. 4). The processing method illustrated in FIG. 3 includes a battery collecting step (step S0), a battery separating step (step S1), a hole making step (step S2), an electrolytic solution sucking step (step S3), a lid separating step (step S4), a terminal separating step (step S5), an electrode body removing step (step S6), an electrode body unwinding step (step S7), and a composite separating step (step S8). Steps S0 to S8 are typically performed in this order. The processing method may further include any other step at any stage.

Figure 4:
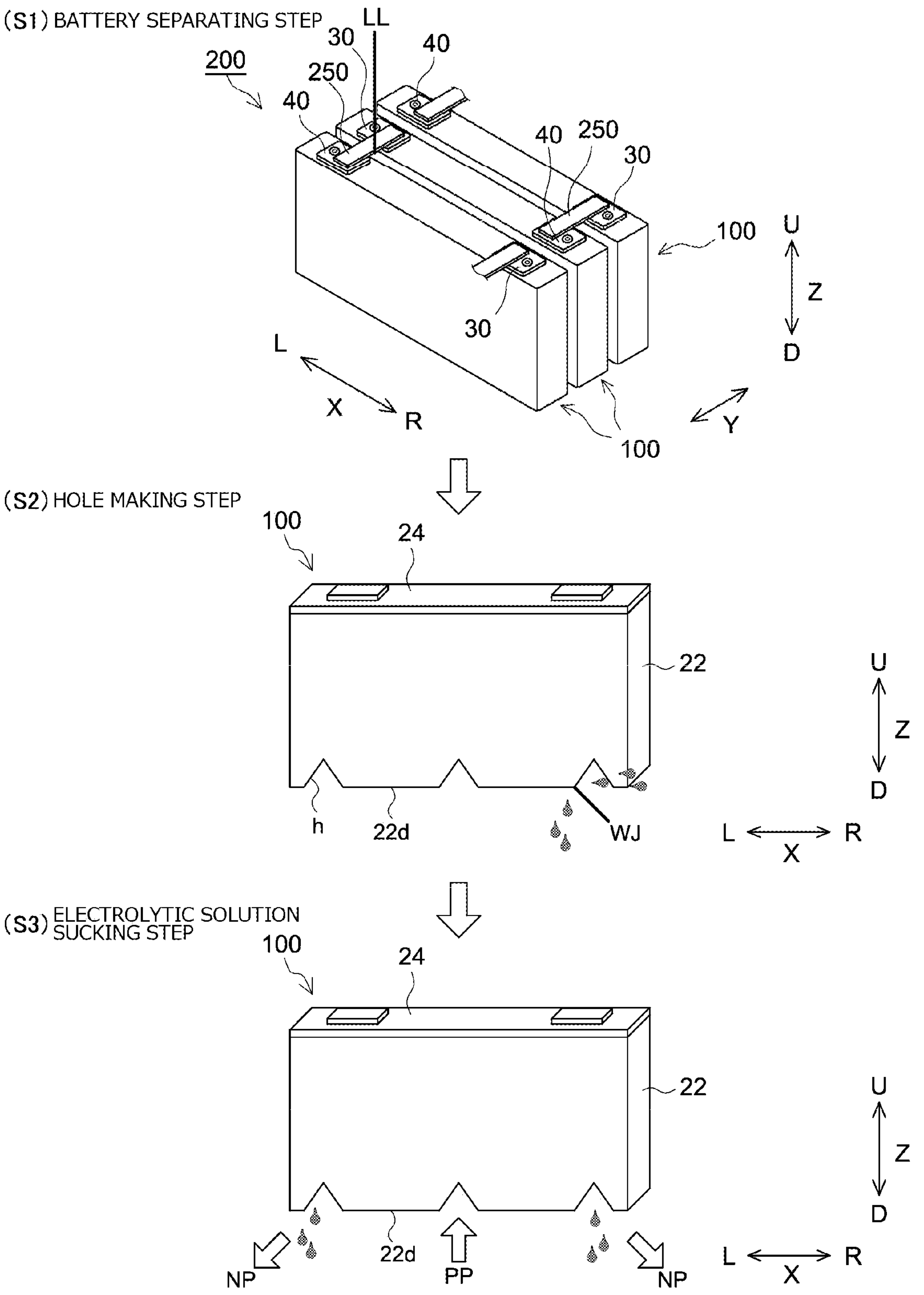
FIG. 4 is a diagram illustrating steps S1 to S3 of FIG. 3.
Figure 5:
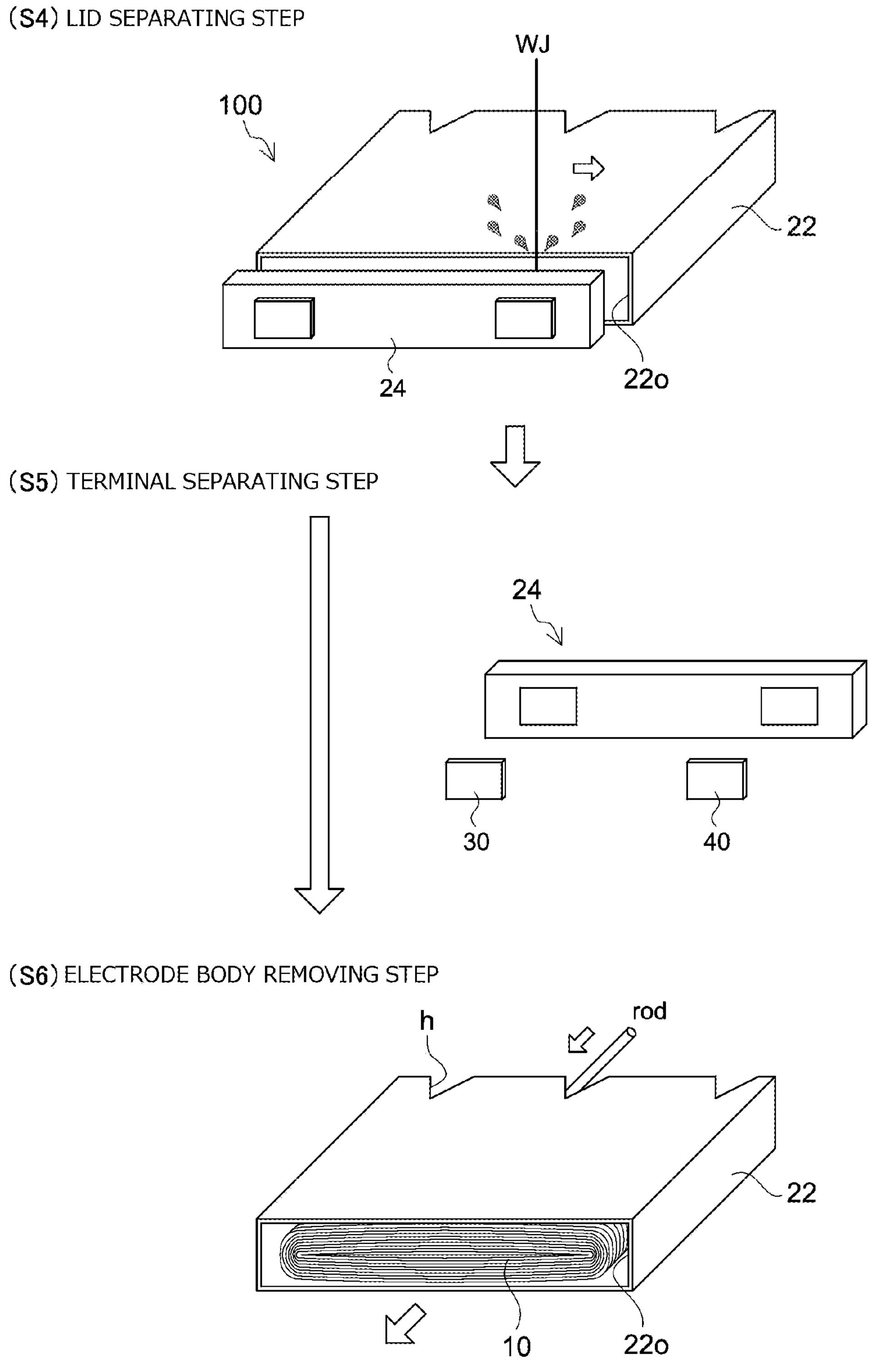
FIG. 5 is a diagram illustrating steps S4 to S6 of FIG. 3.
Figure 6:
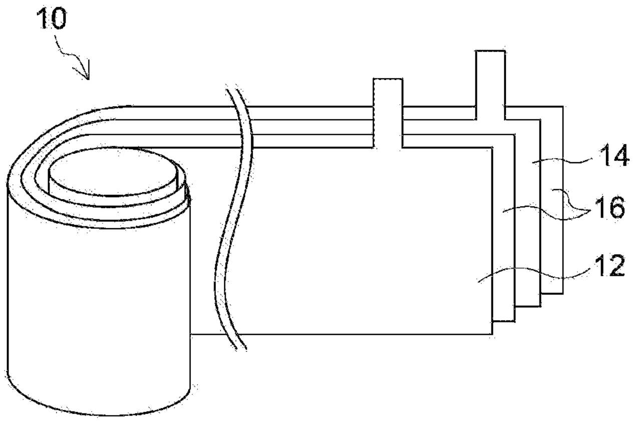
FIG. 6 is a diagram illustrating steps S7 and S8 of FIG. 3.
Figure 6:
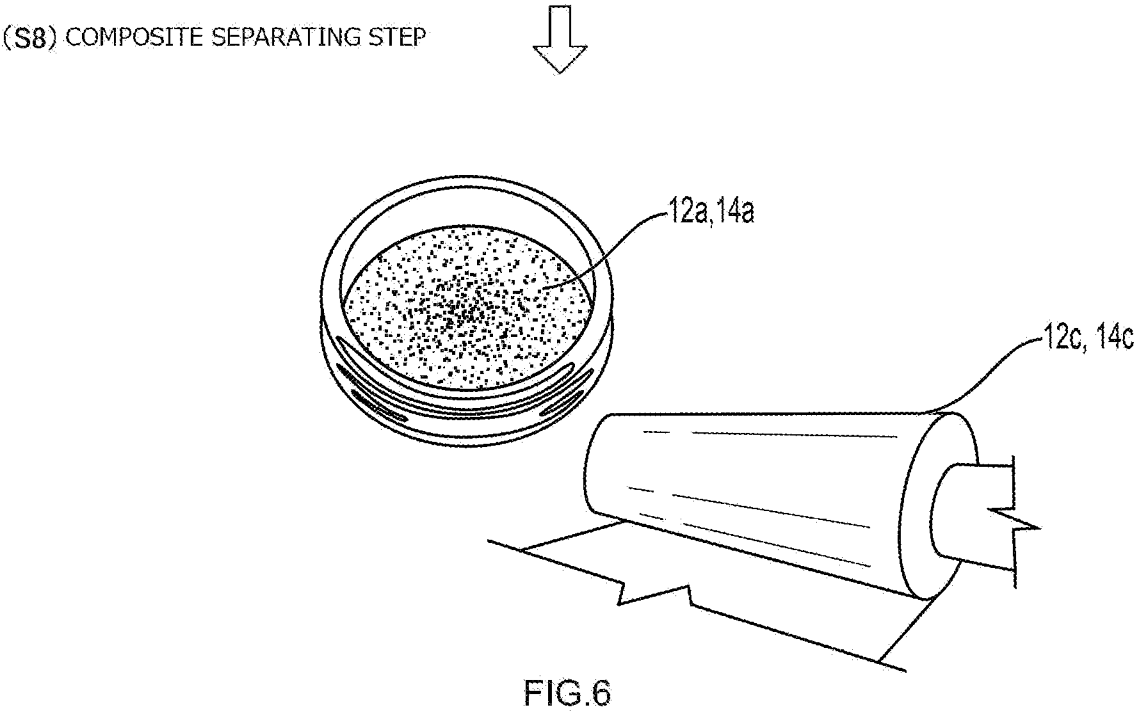

The battery collecting step (step S0) involves collecting the batteries 100. The batteries 100 each typically have a voltage. The batteries 100 may be unused. The batteries 100 may be unusable because of, for example, overcharge or overdischarge and may be unable to be discharged. In the present embodiment, the batteries 100 are collected in the form of the battery pack 200. FIGS. 4 to 6 are diagrams illustrating the steps included in the method for processing the batteries 100 collected.

As illustrated in FIG. 4, the battery separating step (step S1) involves separating the battery pack 200 into the batteries 100 (i.e., cells). The battery pack 200 includes the batteries 100 arranged side by side in the short-side direction Y. The positive and negative electrode terminals 30 and 40 of the batteries 100 adjacent to each other in the short-side direction Y are connected to each other through the busbars 250. The busbars 250 are conductive metal members. In the present embodiment, the battery pack 200 is separated into cells by cutting the busbars 250. The busbars 250 may be cut by a method known in the art, which involves, for example, applying laser light LL to the busbars 250 as illustrated in FIG. 4. After step S1, the process proceeds to step S2. When the batteries 100 collected are not in the form of the battery pack 200 (i.e., when the batteries 100 are already in the form of cells), the processing method may naturally skip the battery separating step (step S1).

As illustrated in FIG. 4, the hole making step (step S2) involves making holes h in the battery case 22. The electrolytic solution is to be discharged through the holes h. The size of each hole h is such that the electrolytic solution is dischargeable therethrough but the electrode body 10 cannot be removed therethrough. Any machine known in the art may be used in making the holes h in the exterior body 20. Among others, a water jet cutter is preferably used. The holes h may be made in an inert gas atmosphere or in an air atmosphere. The use of a water jet cutter makes it possible to not only cut a cutting target without being affected by heat but also achieve cooling effect, which reduces or prevents the risk of ignition. The use of a water jet cutter also leads to improved safety.

As used herein, the term "water jet cutter" refers to any of various apparatuses that cut a cutting target by using high-pressure energy from a thin stream of high-speed and high-density water (hereinafter referred to as a "water jet WJ"), and is a concept encompassing water jet cutting that involves cutting a cutting target with only a fluid (such as water) and abrasive jet cutting that involves cutting a cutting target with a fluid (such as water) mixed with an abrasive. A fluid to be used to cut a cutting target is typically water. Alternatively, a fluid other than water, such as a nonaqueous solvent to be used as the electrolytic solution for the battery 100, may be used to cut a cutting target. Any water jet cutter known in the art may be used. One example of a water jet cutter known in the art is an abrasive jet cutter available from Sugino Machine Limited.

Figure 7:
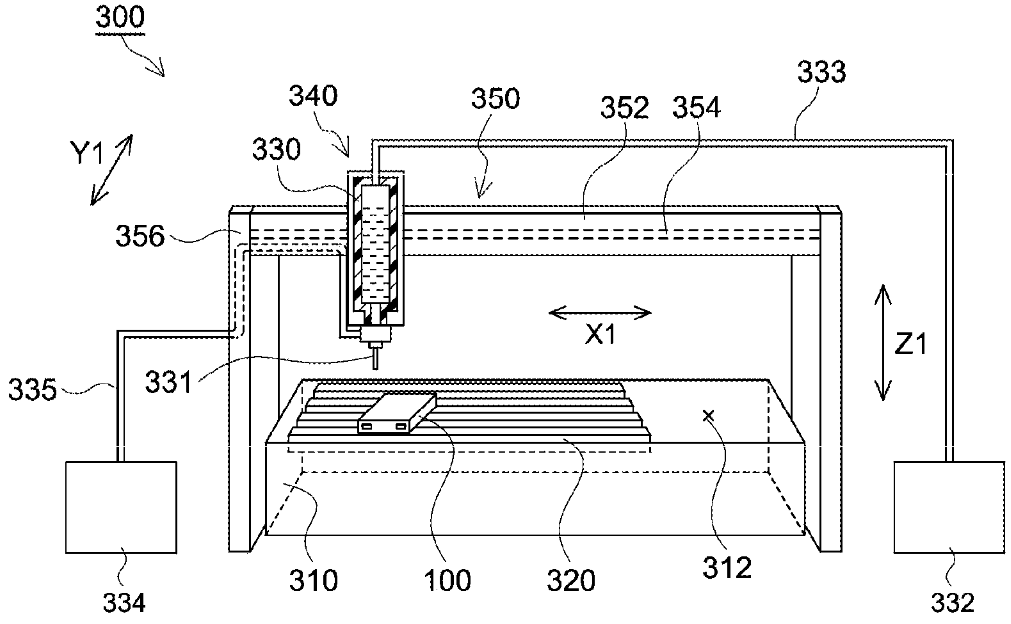
FIG. 7 is a schematic perspective view of a water jet cutter.

FIG. 7 is a perspective view of a water jet cutter 300. The following description is based on the assumption that when an axis X1, an axis Y1, and an axis Z1 are perpendicular or substantially perpendicular to each other, the water jet cutter 300 is disposed on a plane defined by the axis X1 and the axis Y1. The axis X1 extends in a right-left direction (which may hereinafter be referred to as a "right-left direction X1"). The axis Y1 extends in a front-rear direction (which may hereinafter be referred to as a "front-rear direction Y1"). In the present embodiment, the plane defined by the axis X1 and the axis Y1 is a horizontal plane. These directions, however, are defined merely for the sake of convenience of description and do not limit in any way how the water jet cutter 300 may be installed.

The water jet cutter 300 ejects a mixture of a fluid and an abrasive (i.e., the water jet WJ) from a cutting head 330 while moving the cutting head 330 relative to a cutting target. The water jet cutter 300 thus cuts the cutting target. The cutting target may have any shape. The cutting target may be made of any material. In the present embodiment, the cutting target is the battery 100. As illustrated in FIG. 7, the water jet cutter 300 includes a water tank 310, a table 320, the cutting head 330, a high-pressure water feeder 332, an abrasive feeder 334, a carriage 340, a conveyor 350, and a controller (not illustrated).

The table 320 supports the cutting target (i.e., the battery 100). The table 320 is disposed in the water tank 310. The table 320 is secured to an inner surface of the water tank 310. Water is stored in the water tank 310. The water level of the water tank 310 is typically substantially on the same level as an upper surface of the table 320. The table 320 is in the form of a drainboard. The table 320 is disposed below the cutting head 330. The table 320 is smaller than the water tank 310 in a plan view. A portion of the water surface of the water tank 310 is occupied not by the table 320 but by a water tank opening 312. The water tank opening 312 is larger in outer shape than the battery 100. The water tank opening 312 is a space in which the battery 100 is to be immersed in water in the water tank 310 when the battery 100 is ignited.

The cutting head 330 is provided at its lower end with a nozzle 331. The cutting head 330 ejects the water jet WJ from the nozzle 331 to the battery 100 so as to cut the battery 100 placed on the table 320. The nozzle 331 typically has a diameter ϕ of between about 0.01 mm and about 0.5 mm (e.g., 0.1 mm). The cutting head 330 is retained by the carriage 340. The cutting head 330 is electrically connected to the controller (not illustrated). The controller controls ejection of the water jet WJ from the cutting head 330.

The high-pressure water feeder 332 is connected to an upper end of the cutting head 330 through a fluid feeding passage 333. The fluid feeding passage 333 may be made of any suitable material. The fluid feeding passage 333 is, for example, an easily deformable resin tube. The high-pressure water feeder 332 pressurizes a fluid (which is water in the present embodiment) and feeds a high-pressure energy water stream to the cutting head 330. The abrasive feeder 334 is connected to a lower end of the cutting head 330 through an abrasive feeding passage 335. The abrasive feeding passage 335 may be made of any suitable material. The abrasive feeding passage 335 is, for example, an easily deformable resin tube. The abrasive feeder 334 feeds an abrasive to high-pressure water. The pressure of the water jet WJ is suitably changeable in accordance with, for example, the material and thickness of the exterior body 20 and the diameter the nozzle 331. The pressure of the water jet WJ may be any suitable pressure. The pressure of the water jet WJ is typically between 200 MPa and 600 MPa. The pressure of the water jet WJ is preferably 300 MPa or more. The pressure of the water jet WJ is, for example, 600 MPa (which is equivalent to about 6000 atm).

The carriage 340 is equipped with the cutting head 330. The carriage 340 is movable at least in the right-left direction X1 and the front-rear direction Y1 by the conveyor 350. The carriage 340 is electrically connected to the controller (not illustrated). The controller controls movement of the carriage 340 in the right-left direction X1 and the front-rear direction Y1. The conveyor 350 includes: a first conveyor to move the carriage 340 and the cutting head 330 in the right-left direction X1; and a second conveyor to move the carriage 340 and the cutting head 330 in the front-rear direction Y1.

The first conveyor includes: a traverse gutter 352 extending in the right-left direction X1; and a guide shaft 354 disposed inside the traverse gutter 352. The carriage 340 is in slidable engagement with the guide shaft 354. The second conveyor includes: a pair of rails (not illustrated) disposed along the right and left ends of the water tank 310 and extending in the front-rear direction Y1; and a portal platform 356 provided with the traverse gutter 352 and configured to travel along the rails. The conveyor 350 moves the carriage 340 in the right-left direction X1 along the guide shaft 354, and moves the platform 356 in the front-rear direction Y1 along the rails. The conveyor 350 is thus able to move the cutting head 330 in desired directions within the horizontal plane of the table 320. In the course of movement of the cutting head 330, the cutting head 330 is brought into operation and ejects the water jet WJ to the battery 100 placed on the table 320 so as to cut the battery 100.

The hole making step (step S2) preferably involves making the holes h (through which the electrolytic solution is to be discharged) in portions of the battery case 22 located away from the positive electrode terminal 30 and the negative electrode terminal 40. In one example, the hole making step (step S2) preferably involves making the holes h in the bottom wall 22*d* as illustrated in FIG. 4. During the hole making step (step S2), the battery 100 typically has a voltage. Accordingly, the holes h are preferably made such that no contact is made with the electrode body 10. This prevents a short circuit between the positive electrode 12 and the negative electrode 14 during the hole making step (step S2). In the present embodiment, the holes h are made in the bottom wall 22*d*. To be more specific, the holes h are made at predetermined intervals in the long-side direction X. Referring to FIG. 4, the hole making step (step S2) involves making an odd number of holes h. Specifically, the hole making step (step S2) involves making three holes h as illustrated in FIG. 4. Alternatively, the hole making step (step S2) may involve making one hole h, two holes h, or four or more holes h. Portion(s) of the battery case 22 where the hole(s) h is/are to be made may be, for example, side surface(s) of the battery case 22. After step S2, the process proceeds to step S3.

The electrolytic solution sucking step (step S3) involves discharging the electrolytic solution remaining in the exterior body 20. As illustrated in FIG. 4, the electrolytic solution sucking step (step S3) in the present embodiment preferably involves: blowing, for example, air into the exterior body 20 through at least one of the holes h made in the hole making step (step S2) such that a positive pressure PP is created; and sucking the electrolytic solution through the other hole(s) h such that a negative pressure NP is created. The electrolytic solution sucking step (step S3) is thus performed efficiently in a short period of time. Performing the electrolytic solution sucking step (step S3) reduces the amount of electrolytic solution remaining in the exterior body 20. The electrolytic solution may be sucked by using a device known in the art, such as a suction pump or an electrolytic solution sucker. The electrolytic solution that has been sucked is preferably collected. After step S3, the process proceeds to step S4.

The lid separating step (step S4) involves cutting a connection between the electrode body 10 and the electrode terminals 30 and 40 by using the water jet cutter 300 as illustrated in FIG. 5. The use of the water jet cutter 300 makes it possible to cut the cutting target irrespective of what kind of material the cutting target is made of and without being affected by heat. The use of the water jet cutter 300 achieves cooling effect so as to reduce or prevent the risk of ignition. The use of the water jet cutter 300 also makes it possible to improve safety and to perform the lid separating step (step S4) not only in an inert gas atmosphere but also in an air atmosphere. Accordingly, the techniques disclosed herein do not include the step of performing a discharging process on the battery 100 between the battery collecting step (step S0) and the lid separating step (step S4). As used herein, the term "discharging process" not only refers to a process involving circuit connection, such as the process of connecting the battery 100 to a charging and discharging device so as to forcedly discharge the battery 100 at constant current or low voltage as mentioned in, for example, JP 2020-198320 A, but also refers to processes known in the art involving decreasing the voltage of the battery 100, such as a salt water process, a freezing process, and a burning process. Because the processing method does not include the step of performing a discharging process, the battery 100 collected is processed more easily in a shorter time than before. If the battery 100 has a voltage or is unable to be discharged because of, for example, overcharge or overdischarge, the battery 100 would be processed safely. The lid separating step (step S4) is an example of a "cutting step".

In the present embodiment, the battery 100 is placed sideways on the table 320 of the water jet cutter 300, and the water jet cutter 300 ejects the water jet WJ along the boundary between the battery case 22 and the lid 24. The water jet cutter 300 is thus able to cut the exterior body 20, a positive electrode tab portion of the positive electrode collector 12*c*, and a negative electrode tab portion of the negative electrode collector 14*c* along the virtual line (or chain double-dashed line) C in FIG. 2, for example, such that the lid 24 is separated from the electrode body 10 and the battery case 22. Accordingly, the water jet cutter 300 is able to separate the electrode terminals 30 and 40 from the electrode body 10 without causing damage to the electrode body 10. Consequently, the purity of material(s) collected and the utility value thereof are higher than when a battery is cut into small pieces as described in, for example, Japanese Patent No. 6828214.

In the event that the battery 100 is ignited during the lid separating step (step S4), the battery 100 is slid from the upper surface of the table 320 to the water tank opening 312 and immersed in water in the water tank 310, which extinguishes a fire in the battery 100. This eliminates the need to additionally prepare a fire extinguishing system, resulting in a reduction in the burden of advance preparations. Thus, the lid 24 is separated from the electrode body 10 and the battery case 22, and an opening 22*o* larger than the electrode body 10 when viewed in cross section is formed in the battery case 22. After step S4, the process proceeds to step S5.

As illustrated in FIG. 5, the terminal separating step (step S5) involves separating the electrode terminals 30 and 40 from the lid 24. In the present embodiment, the positive electrode external conductive member 32 and the negative electrode external conductive member 42 are respectively connected to the electrode terminals 30 and 40 above the upper surface of the lid 24. The lid 24, the positive electrode terminal 30, and the positive electrode external conductive member 32 are each made of aluminum. The negative electrode terminal 40 and the negative electrode external conductive member 42 are each made of copper. A mixture of aluminum and copper is often regarded as waste. From the viewpoint of recycling, the terminal separating step (step S5) preferably involves separating at least the negative electrode terminal 40 and the negative electrode external conductive member 42 from the lid 24 because the negative electrode terminal 40 and the negative electrode external conductive member 42 are each made of a material different from that of the lid 24. The negative electrode terminal 40 may be separated from the lid 24 by, for example, stamping the lid 24 into a size larger than the outer shape of the negative electrode external conductive member 42. Thus, other components, such as copper, are more unlikely to be mixed into aluminum and the purity of material(s) collected is higher than when a battery is cut into small pieces as described in, for example, Japanese Patent No. 6828214. Accordingly, the utility value of the material(s) collected is enhanced. The processing method may skip a magnetic separation step that has conventionally been performed. For example, when the lid 24 and the electrode terminals 30 and 40 are made of the same material, the terminal separating step (step S5) may be skipped. After step S5, the process proceeds to step S6.

As illustrated in FIG. 5, the electrode body removing step (step S6) involves removing the electrode body 10 from the battery case 22. The electrode body 10 may contain the electrolytic solution and may thus be swollen. When the battery 100 is a recent high-energy-density battery, the distance (or clearance) between an outer surface of the electrode body 10 and an inner surface of the battery case 22 is shorter than before, making it difficult to remove the electrode body 10 from the battery case 22. Accordingly, the present embodiment involves removing the electrode body 10 by using the hole h made in the hole making step (step S2). Specifically, a rod that is typically insulative (e.g., a resin pushing rod) is inserted into the hole h so as to press the electrode body 10, with the result that the electrode body 10 is pushed out of the opening 22*o* of the battery case 22. The present embodiment is thus able to smoothly take the electrode body 10 out of the battery case 22, so that breakage of or damage to the electrode body 10 is unlikely to occur. The present embodiment also enhances working efficiency. After step S6, the process proceeds to step S7.

As illustrated in FIG. 6, the electrode body unwinding step (step S7) involves unwinding the electrode body 10 removed from the battery case 22, such that the electrode body 10 is separated into the strip-shaped positive electrode 12, the strip-shaped negative electrode 14, and the strip-shaped separators 16. This reduces the time and effort required to select, for example, metal(s) and improves the usability of material(s) collected. After step S7, the process proceeds to step S8. When the electrode body 10 is a laminated electrode body, the electrode body unwinding step (step S7) may naturally be skipped.

As illustrated in FIG. 6, the composite separating step (step S8) involves separating the positive electrode 12 into the positive electrode collector 12*c* and the positive electrode composite layer 12*a* (which is "black mass"), and separating the negative electrode 14 into the negative electrode collector 14*c* and the negative electrode composite layer 14*a* (which is "black mass"). The positive electrode composite layer 12*a* may hereinafter be referred to as a "positive electrode composite 12*a*". The collectors may be separated from the composites by any suitable method. The collectors may be separated from the composites by any method known in the art. Examples of a method for separating the collectors from the composites include a method involving using ultrasonic waves, a method involving using a jet stream, and a method involving immersion in an acidic solution. Separating the collectors from the composites makes it possible to skip a magnetic separation step that has conventionally been performed. Although the following description focuses on the positive electrode 12, the procedure described below may also be performed for the negative electrode 14.

The method involving using ultrasonic waves is performed by, for example, placing the positive electrode 12 in an ultrasonic tank such that the positive electrode 12 is immersed in a liquid, such as a nonaqueous solvent, and then vibrating the liquid. This peels the positive electrode composite 12*a* from the positive electrode collector 12*c*. The method involving using a jet stream is performed by applying energy, such as a water jet stream, a vapor jet stream, or an air jet stream, to the positive electrode 12 for which adhesiveness of the binder is reduced by, for example, heat, and crushing the positive electrode composite 12*a* with the energy. The positive electrode collector 12*c* is thus separated from the positive electrode composite 12*a*. The positive electrode composite 12*a* separated is centrifuged and dried, so that the positive electrode composite 12*a* is turned into powder.

The positive electrode composite 12*a* in powder form contains valuable metals. The positive electrode composite 12*a* in powder form contains, in particular, rare metals, such as lithium (Li) and a transition metal (e.g., Ni, Co, or Mn). Rare metals may be collected from the positive electrode composite 12*a* by any method known in the art. In one example, the positive electrode composite 12*a* is dissolved in acid and is then subjected to electrodialysis or pH adjustment, so that Li and Co are precipitated in the form of hydroxides. The hydroxides are filtered, washed with water, dried, and fired, with the result that rare metals are separated and collected in the form of oxides. Performing this method makes it more unlikely that intrusion of components of the exterior body 20, such as aluminum and copper, will occur and rare metals of higher purity are separated and collected than when a battery is cut into small pieces as described in, for example, Japanese Patent No. 6828214. As described thus far, the processing method disclosed herein may also be regarded as a method for collecting valuable metals (or in particular, rare metals).

Although the preferred embodiment of the present application has been described thus far, the foregoing embodiment is only illustrative, and the present application may be embodied in various other forms. The present application may be practiced based on the disclosure of this specification and technical common knowledge in the related field. The techniques described in the claims include various changes and modifications made to the embodiment illustrated above. Any or some of the technical features of the foregoing embodiment, for example, may be replaced with any or some of the technical features of variations of the foregoing embodiment. Any or some of the technical features of the variations may be added to the technical features of the foregoing embodiment. Unless described as being essential, the technical feature(s) may be optional.

Variation 1

As illustrated in FIG. 3, the processing method according to the foregoing embodiment includes the hole making step (step S2) and the electrolytic solution sucking step (step S3). Steps S2 and S3, however, may be optional. In particular, when a solid electrolyte is used and the positive and negative electrodes 12 and 14 are integral with each other, steps S2 and S3 are unnecessary. When the hole making step (step S2) is skipped, the electrode body removing step (step S6) may involve inserting a jig through the opening 22*o* of the battery case 22 so as to remove the electrode body 10 from the battery case 22.

Variation 2

The hole making step (step S2) and the lid separating step (step S4) according to the foregoing embodiment involve using the water jet cutter 300 that ejects high-pressure water as illustrated in FIG. 7. The water jet cutter 300, however, does not necessarily have to eject high-pressure water. Alternatively, the water jet cutter 300 may use a nonaqueous solvent instead of water. In one example, a nonaqueous solvent (e.g., EMC) may be separated from the electrolytic solution collected in the electrolytic solution sucking step (step S3), and the water jet cutter 300 may eject the nonaqueous solvent separated (e.g., carbonates, such as EMC). In this case, the high-pressure water feeder 332 may pressurize the nonaqueous solvent and feed the pressurized nonaqueous solvent to the cutting head 330. This makes it possible to effectively reuse the electrolytic solution. The water tank 310 may be filled with the nonaqueous solvent instead of water. Accordingly, this variation is able to prevent the electrolytic solution from being mixed into water, reduce a burden on the environment, and reduce the time and effort required for processing.

Variation 3

As illustrated in FIG. 2, the foregoing embodiment involves swaging the electrode terminals 30 and 40 to the lid 24. As illustrated in FIG. 5, the terminal separating step (step S5) involves separating the lid 24 from the electrode terminals 30 and 40 by stamping. The lid 24, however, does not necessarily have to be separated from the electrode terminals 30 and 40 by stamping. When electrode terminals and insulators made of resin (e.g., PPS) are assembled to a lid by insert molding such that the electrode terminals, the insulators, and the lid are integral with each other as described in, for example, JP 2021-086813 A and JP 2021-086814 A, step S5 may involve performing a heating process so as to separate the lid from the electrode terminals. Specifically, the lid separated in lid separating step (step S4) is heated to a temperature equal to or higher than the melting point of the resin insulators (which is 280° or higher when the insulators are made of PPS). This heating melts the insulators interposed between the lid and the electrode terminals and reduces the adhesion therebetween, resulting in separation of the lid from the electrode terminals.

As described above, specific embodiments of the techniques disclosed herein include those described in clauses below.

Clause 1: A lithium ion battery processing method including a collecting step and a cutting step, the collecting step involving collecting a lithium ion battery including: an electrode body; a battery case including an opening and housing the electrode body; a lid closing the opening of the battery case; and an electrode terminal connected to the electrode body inside the battery case and partially exposed to outside of the battery case, the cutting step involving cutting a connection between the electrode terminal and the electrode body of the collected lithium ion battery by using a water jet cutter, wherein the processing method includes no lithium ion battery discharging step between the collecting step and the cutting step.

Clause 2: The processing method according to clause 1, wherein the cutting step involves cutting the lithium ion battery having a voltage.

Clause 3: The processing method according to clause 1 or 2, wherein the electrode terminal is attached to the lid, and the cutting step involves separating the lid from the electrode body and the battery case.

Clause 4: The processing method according to clause 3, wherein the lid and the electrode terminal are made of different materials, and the processing method further includes a terminal separating step involving separating the electrode terminal from the lid after the cutting step.

Clause 5: The processing method according to any one of clauses 1 to 4, wherein the lithium ion battery collected includes an electrolytic solution, and the processing method further includes: a hole making step involving, before the cutting step, making a hole in the battery case by using the water jet cutter; and an electrolytic solution sucking step involving sucking the electrolytic solution through the hole.

Clause 6: The processing method according to claim 5, further including an electrode body removing step involving, after the electrolytic solution sucking step and the cutting step, inserting a pushing rod through the hole so as to push the electrode body out of the opening of the battery case.

Clause 7: The processing method according to any one of clauses 1 to 6, wherein the lithium ion battery includes a solvent, the water jet cutter includes a cutting head to eject a fluid, and the cutting head is configured to eject the solvent collected from the lithium ion battery.

Although the preferred embodiment of the present application has been described thus far, the foregoing embodiment is only illustrative, and the present application may be embodied in various other forms. The present application may be practiced based on the disclosure of this specification and technical common knowledge in the related field. The techniques described in the claims include various changes and modifications made to the embodiment illustrated above. Any or some of the technical features of the foregoing embodiment, for example, may be replaced with any or some of the technical features of variations of the foregoing embodiment. Any or some of the technical features of the variations may be added to the technical features of the foregoing embodiment. Unless described as being essential, the technical feature(s) may be optional.

REFERENCE SIGNS LIST

10 electrode body
20 exterior body
22 battery case
22*h* opening
24 lid
30 positive electrode terminal (electrode terminal)
40 negative electrode terminal (electrode terminal)
100 lithium ion battery
200 battery pack
300 water jet cutter
310 water tank
320 table
330 cutting head
331 nozzle
332 high-pressure water feeder
334 abrasive feeder
340 carriage
350 conveyor

What is claimed is:

1. A lithium ion battery processing method comprising a collecting step and a cutting step, the collecting step involving collecting a lithium ion battery including an electrode body, a battery case including an opening and housing the electrode body, a lid closing the opening of the battery case, and an electrode terminal connected to the electrode body inside the battery case and partially exposed to outside of the battery case, the cutting step involving cutting a connection between the electrode terminal and the electrode body of the collected lithium ion battery by using a water jet cutter, wherein the lithium ion battery collected includes an electrolytic solution, and the processing method further comprises a hole making step involving, before the cutting step, making a hole in the battery case by using the water jet cutter, and an electrolytic solution sucking step involving sucking the electrolytic solution through the hole, and wherein the processing method comprises no lithium ion battery discharging step between the collecting step and the cutting step.

2. The processing method according to claim 1, further comprising an electrode body removing step involving, after the electrolytic solution sucking step and the cutting step, inserting a pushing rod through the hole so as to push the electrode body out of the opening of the battery case.

3. The processing method according to claim 1, wherein the lithium ion battery includes a solvent, the water jet cutter includes a cutting head to eject a fluid, and the cutting head is configured to eject the solvent collected from the lithium ion battery.

4. The processing method according to claim 1, wherein the cutting step involves cutting the lithium ion battery having a voltage.

5. The processing method according to claim 1, wherein the electrode terminal is attached to the lid, and the cutting step involves separating the lid from the electrode body and the battery case.

6. The processing method according to claim 5, wherein the lid and the electrode terminal are made of different materials, and the processing method further comprises a terminal separating step involving separating the electrode terminal from the lid after the cutting step.

* * * * *